United States Patent
Pezeshki et al.

(10) Patent No.: US 11,677,454 B2
(45) Date of Patent: Jun. 13, 2023

(54) REPORTING BEAM MEASUREMENTS FOR PROPOSED BEAMS AND OTHER BEAMS FOR BEAM SELECTION

(71) Applicant: QUALCOMM Incorporated, San Diego, CA (US)

(72) Inventors: Hamed Pezeshki, San Diego, CA (US); Sony Akkarakaran, Poway, CA (US); Tao Luo, San Diego, CA (US); Taesang Yoo, San Diego, CA (US); Jingchao Bao, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 50 days.

(21) Appl. No.: 17/238,153

(22) Filed: Apr. 22, 2021

(65) Prior Publication Data
US 2021/0336683 A1    Oct. 28, 2021

Related U.S. Application Data

(60) Provisional application No. 63/015,405, filed on Apr. 24, 2020.

(51) Int. Cl.
*H04W 24/10* (2009.01)
*H04B 7/06* (2006.01)
*H04B 17/318* (2015.01)
*H04W 76/11* (2018.01)

(52) U.S. Cl.
CPC ......... *H04B 7/0695* (2013.01); *H04B 17/318* (2015.01); *H04W 24/10* (2013.01); *H04W 76/11* (2018.02)

(58) Field of Classification Search
CPC .. H04B 7/0695; H04B 17/318; H04B 7/0647; H04B 7/06; H04W 24/10; H04W 76/11; H04W 16/28
See application file for complete search history.

(56) References Cited

U.S. PATENT DOCUMENTS

| | | | |
|---|---|---|---|
| 2017/0012692 A1 | 1/2017 | Kim et al. | |
| 2019/0182683 A1* | 6/2019 | Khirallah | H04W 16/28 |
| 2020/0162952 A1* | 5/2020 | Yu | H04W 24/10 |

FOREIGN PATENT DOCUMENTS

| | | |
|---|---|---|
| WO | 2014036150 A1 | 3/2014 |
| WO | 2019019945 A1 | 1/2019 |

OTHER PUBLICATIONS

International Search Report and Written Opinion—PCT/US2021/028806—ISA/EPO—dated Jul. 21, 2021.

* cited by examiner

*Primary Examiner* — Chuong A Ngo
(74) *Attorney, Agent, or Firm* — Holland & Hart LLP

(57) ABSTRACT

Various aspects of the present disclosure relate to beam management procedures in wireless communications systems. Some implementations of the present disclosure more specifically provide techniques for reporting measurements for proposed beams (such as beams predicted to be the best beams for communications to and from a UE and a network entity) and other beams detected by the UE. The techniques may be used, for example, to identify mismatches between a proposed set of beams and actual best beams for communications to and from a UE and a network entity and allow for the retraining of machine learning models used to identify the proposed set of beams for communications to and from a UE and a network entity.

24 Claims, 10 Drawing Sheets

REPORTING BEAM MEASUREMENTS FOR PROPOSED BEAMS AND OTHER BEAMS FOR BEAM SELECTION

CROSS-REFERENCE TO RELATED APPLICATIONS

This application claims benefit to U.S. Provisional Patent Application Ser. No. 63/015,405, entitled "Reporting Beam Measurements for Proposed Beams and Other Beams for Beam Selection," filed Apr. 24, 2020 and assigned to the assignee hereof, the contents of which are hereby incorporated by reference in its entirety.

TECHNICAL FIELD

This disclosure relates generally to wireless communications, and more particularly, to techniques for reporting measurements for proposed beams and other beams for communications between a user equipment (UE) and a network entity.

DESCRIPTION OF THE RELATED TECHNOLOGY

Wireless communication systems are widely deployed to provide various telecommunication services such as telephony, video, data, messaging, and broadcasts. These wireless communication systems may employ multiple-access technologies capable of supporting communication with multiple users by sharing available system resources (for example, bandwidth, time, space, and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

In 5G NR, beam management procedures are generally used to identify beams to use for communications to and from a UE and a base station. The beams may be selected using a beam sweep, in which a network entity transmits a signal on each of a plurality of beams, and a UE reports information identifying the beams that the UE detected and signal quality metrics for the identified beams. The beam sweep may include transmissions on each of the plurality of beams that can be used for communications to and from the UE and the base station, though the UE may not be able to detect all of the beams. Thus, communications resources (e.g., time and frequency resources) may be wasted when a network entity performs beam management procedures.

SUMMARY

The systems, methods, and devices of the disclosure each have several innovative aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include efficient selection of beams for communications to and from a UE and a network entity, for example, to select a reduced number of optimal beams that may allow for reduced monitoring time by a UE and/or free up resources for data transmissions.

One innovative aspect of the subject matter described in this disclosure can be implemented in a method for wireless communication. The method can be performed, for example, by a user equipment (UE). The method generally includes receiving, from a network entity, information configuring the UE to report measurements for at least a set of one or more proposed beams determined by the network entity; performing measurements on the set of proposed beams and one or more additional beams identified not in the set of proposed beams; and transmitting, to the network entity, one or more reports including the measurements for the proposed beams and the one or more additional beams. In some implementations, the method may further comprise transmitting, to the network entity, position information associated with a location of the UE, wherein the information configuring the UE to report measurements for the proposed beams in addition to the other beams is received based at least on transmitting the location information.

In some implementations, the set of proposed beams may include one or more beams predicted by the network entity to have a highest received signal quality based on the position information associated with the location of the UE.

In some implementations, the transmitting may comprise transmitting a first report including the measurements for the set of proposed beams and transmitting a second report including the measurements for the additional beams. Generally, the first report and the second report may be transmitted in separate transmissions. The transmitting may comprise periodically transmitting the first and second reports, where the first reports are transmitted less frequently than the second reports.

In some implementations, the transmitting may comprise transmitting a single report including the measurements for the set of proposed beams and the measurements for the one or more additional beams.

In some implementations, the information may indicate one or more sets of proposed beams and additional information for each set of proposed beams, and the method may further comprise determining which set of proposed beams to perform measurements and transmit reports for based on the additional information. The additional information comprise a cell identifier (cell ID), and the UE may perform measurements for a set of proposed beams associated with the cell ID, if detected. The additional information comprise one or more predicted reference signal received power (RSRP) values, and the UE may report measurements for a set of proposed beams if an RSRP measurement for one or more proposed beams in the set is below a predicted RSRP value for the one or more proposed beams. The additional information may comprise at least one of a reliability or probability for each set. The reliability information may correspond to a predicted likelihood that the UE will successfully receive transmissions on the set of proposed beams, and the probability information may correspond to a predicted probability that the UE will detect the set of proposed beams. The UE may prioritize measurement of the sets of proposed beams based on the reliability or probability of each set.

Another innovative aspect of the subject matter described in this disclosure can be implemented in a method for wireless communication. The method can be performed, for example, by a network entity, such as a gNodeB. The method generally includes selecting, from a data set, a set of one or more proposed beams for communicating with a user equipment (UE); transmitting, to the UE, information configuring the UE to report measurements for the set of proposed beams selected by the network entity; receiving, from the UE, one or more reports including measurements for the set of proposed beams and one or more additional beams not in the set of proposed beams; and updating the data set based on the measurements for the set of proposed beams and the one or more additional beams.

In some implementations, the method may further comprise receiving, from the UE, position information associated with a location of the UE, wherein the information configuring the UE to report measurements for the set of proposed beams in addition to the additional beams is transmitted based at least on receiving the location information. In some implementations, the set of proposed beams may comprise one or more beams predicted to have a highest received signal quality based on the position information associated with the location of the UE.

In some implementations, the receiving may comprise receiving a first report including the measurements for the set of proposed beams and receiving a second report including the measurements for the additional beams. The first report and the second report may be received in separate transmissions from the UE. The receiving may comprise periodically receiving first reports including the measurements for the set of proposed beams and periodically receiving second reports including the measurements for the additional beams, and the first reports may be received less frequently than the second reports.

In some implementations, the receiving may comprise receiving a single report including the measurements for the set of proposed beams and the measurements for the additional beams.

In some implementations, the information indicates one or more sets of proposed beams and additional information for each of the sets of proposed beams. The additional information may comprise a cell identifier (cell ID), and the report may comprise measurements for a set of proposed beams associated with the cell ID, if detected. The additional information may comprise one or more predicted reference signal received power (RSRP) values, and the report may comprise measurements for a set of proposed beams if an RSRP measurement for one or more proposed beams in the set is below a predicted RSRP value for the one or more proposed beams. The additional information may comprise at least one of a reliability or probability for each set. The reliability information may correspond to a predicted likelihood that the UE will successfully receive transmissions on the set of proposed beams, and the probability information may correspond to a predicted probability that the UE will detect the set of proposed beams. The report may comprise measurements prioritized based on the reliability or probability of each set.

Other innovative aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various innovative aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
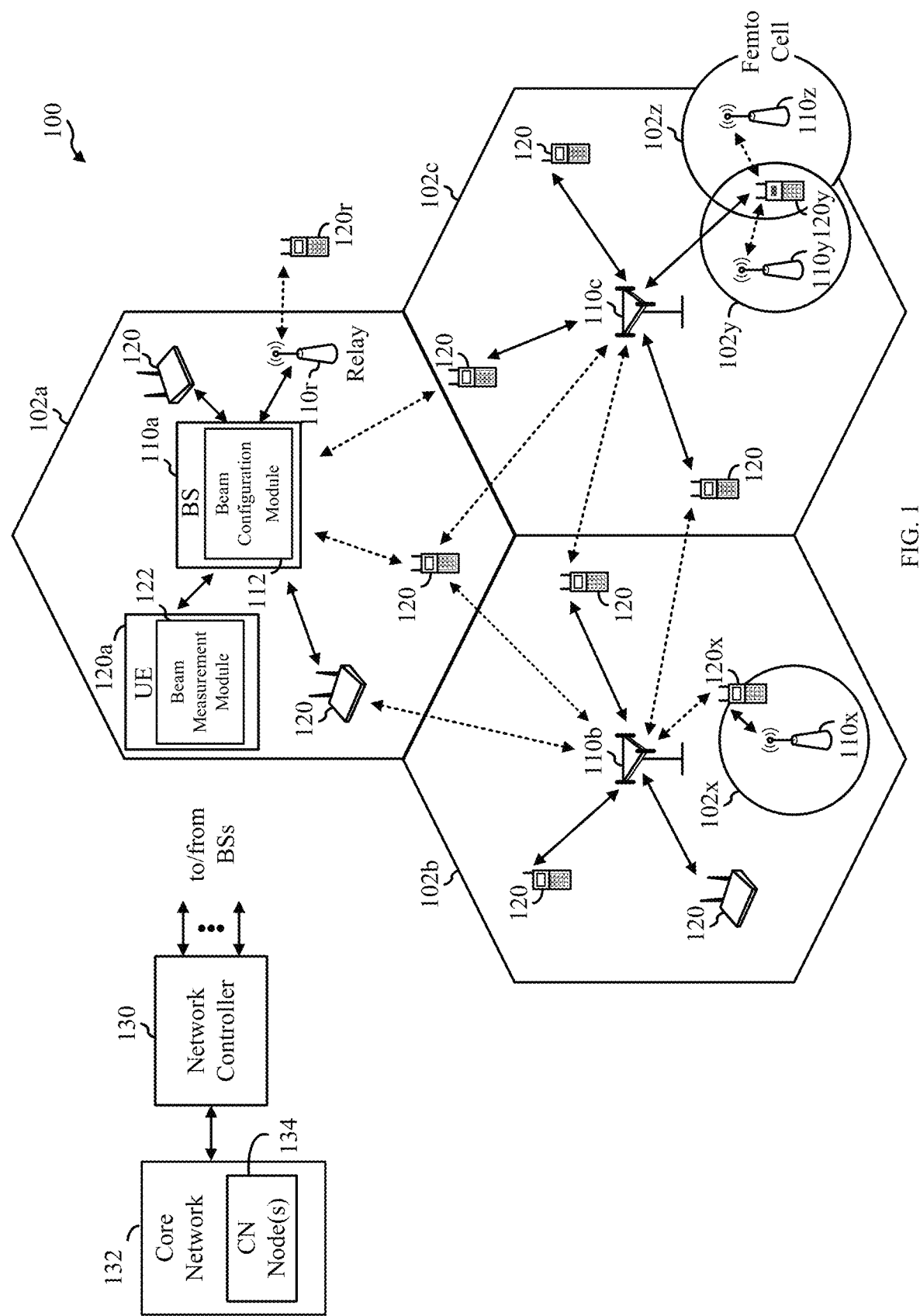
FIG. 1 shows a block diagram conceptually illustrating an example wireless communication network, in accordance with some aspects of the present disclosure.

The following description is directed to some particular implementations for the purposes of describing innovative aspects of this disclosure. Innovative aspects of this disclosure generally provides examples beam selection using quantized orientation information and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Various aspects relate generally to beam management procedures in wireless communications systems. Some aspects more specifically relate to the reporting, by a user equipment (UE), of measurements for a set of beams proposed by a network entity, for example, beams predicted by the network entity to be the best beams for communications between the UE and the network entity. In some aspects, the UE further reports measurements for one or more other beams identified by the UE. In some implementations, the network entity can select beams to include in the proposed set of beams based on UE position (e.g., location and/or orientation) information and a machine learning model that is configured to predict a set of beams that may be the best beams for communications to and from the UE and the network entity. The beams in the proposed set of beams may be a subset of the beams that the network entity can generally use for communications to and from the UE and the network entity. The network entity can use the measurements reported by the UE for the proposed set of beams and the other beams to determine whether a data set used to generate the proposed set of beams, which may include UE position information mapped to a set of beams used to train the machine learning model, is inaccurate and should be updated.

Particular aspects of the subject matter described in this disclosure can be implemented to realize one or more of the following potential advantages. In some examples, the described techniques can be used to reduce an amount of time spent identifying beams to use in communications to and from a UE and a network entity. Further, because fewer time-frequency resources may be used during beam management procedures, more time-frequency resources may be available for use in data transmissions to and from the UE and the network entity, which may provide for increased bandwidth and data carrying capacity in a wireless communications system. Still further, by reporting information about other beams measured by the UE, the network entity can detect mismatches between the proposed set of beams including the predicted best beams and the actual best beams identified by a UE for a given position and may revise a data set and retrain a machine learning model to account for the actual best beams identified by the UE for a given position.

In general, any number of wireless networks may be deployed in a given geographic area. Each wireless network may support a particular radio access technology (RAT) and may operate on one or more carriers in one or more frequency bands. A RAT may also be referred to as an air interface. Within the carriers, wireless device such as base stations and UEs may operate on various frequency resources including subcarriers (or "tones"), channels, or subbands. RATs within a given geographic area may operate on different frequency to avoid interference with one another.

The techniques described herein may be used for various wireless networks and radio technologies. While aspects may be described herein using terminology commonly associated with 3G, 4G, and/or new radio (for example, 5G NR) wireless technologies, aspects of the present disclosure can be applied in other generation-based communication systems.

NR access may support various wireless communication services, such as enhanced mobile broadband (eMBB) targeting wide bandwidth (for example, 80 MHz or beyond), millimeter wave (mmW) targeting high carrier frequency (for example, 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

The techniques presented herein may be applied in various bands utilized for NR. For example, for the higher band referred to as FR4 (for example, 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec.

FIG. 1 illustrates an example wireless communication network 100 in which aspects of the present disclosure may be performed. For example, a base station (BS) 110a of the wireless communication network 100 may be configured with a beam configuration module 112 configured to perform (or assist BS 110 in performing) operations 700 of FIG. 7 to configure a UE to report measurements for one or more proposed beams based on reported UE orientation information, in accordance with aspects of the present disclosure. Similarly, a UE 120a of the wireless communication network 100 may be configured with an beam measurement module 122 configured to perform (or assist UE 120 in performing) operations 600 of FIG. 6 to receive beam configuration information from a network entity and measure at least one or more proposed beams (for example, from BS 110a), in accordance with aspects of the present disclosure.

The wireless communication network 100 may be an NR system (for example, a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (for example, via a backhaul).

The BSs 110 communicate with UEs 120a-y (each also individually referred to herein as UE 120 or collectively as UEs 120) in the wireless communication network 100. The UEs 120 (for example, 120x and 120y) may be dispersed throughout the wireless communication network 100, and each UE 120 may be stationary or mobile. Wireless communication network 100 may also include relay stations (for example, relay station 110r), also referred to as relays or the like, that receive a transmission of data and/or other information from an upstream station (for example, a BS 110a or a UE 120r) and sends a transmission of the data and/or other information to a downstream station (for example, a UE 120 or a BS 110), or that relays transmissions between UEs 120, to facilitate communication between devices.

Figure 2:
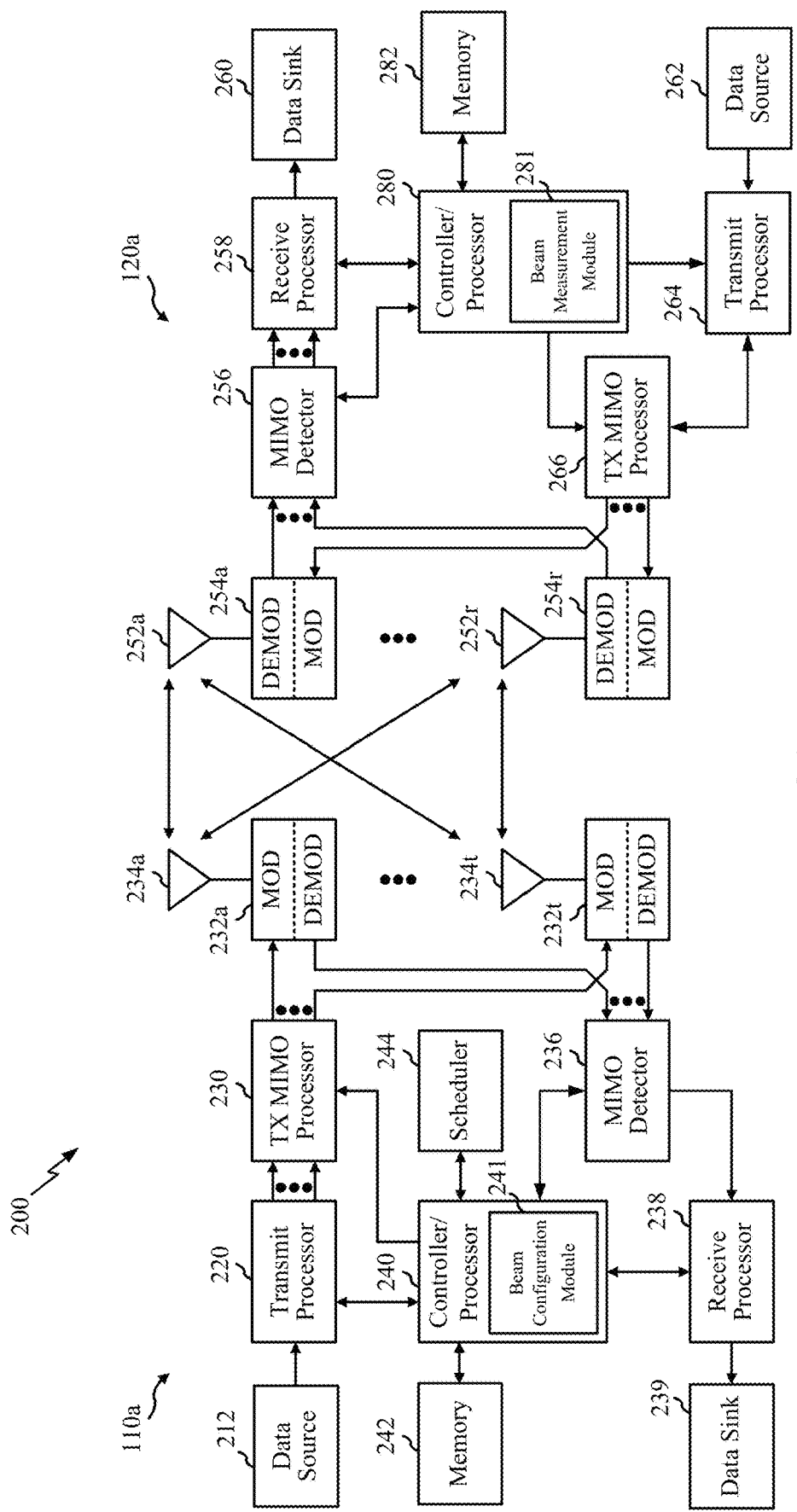
FIG. 2 shows a block diagram conceptually illustrating an example a base station (BS) and an example user equipment (UE), in accordance with some aspects of the present disclosure.

FIG. 2 illustrates example components of BS 110a and UE 120a (for example, in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH) or group common PDCCH (GC PDCCH), among other examples. The data may be for the physical downlink shared channel (PDSCH), among other examples. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (for example, precoding) on the data symbols, the control symbols, and/or the reference symbols, if applicable, and may provide output symbol streams to the modulators (MODs) 232a-232t. Each modulator 232 may process a respective output symbol stream (for example, for OFDM) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the modulators in transceivers 254a-254r (for example, for SC-FDM), and transmitted to the BS 110a. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a beam configuration module 241 and the controller/processor 280 of the UE 120a has a beam measurement module 281. The beam configuration module 241 may be configured to perform operations 700 of FIG. 7 and/or the beam measurement module 281 may be configured to perform operations 600 of FIG. 6. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones or bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (for example, 30 kHz, 60 kHz, 120 kHz or 240 kHz). The symbol and slot lengths scale with the subcarrier spacing. The CP length also depends on the subcarrier spacing.

Figure 3:
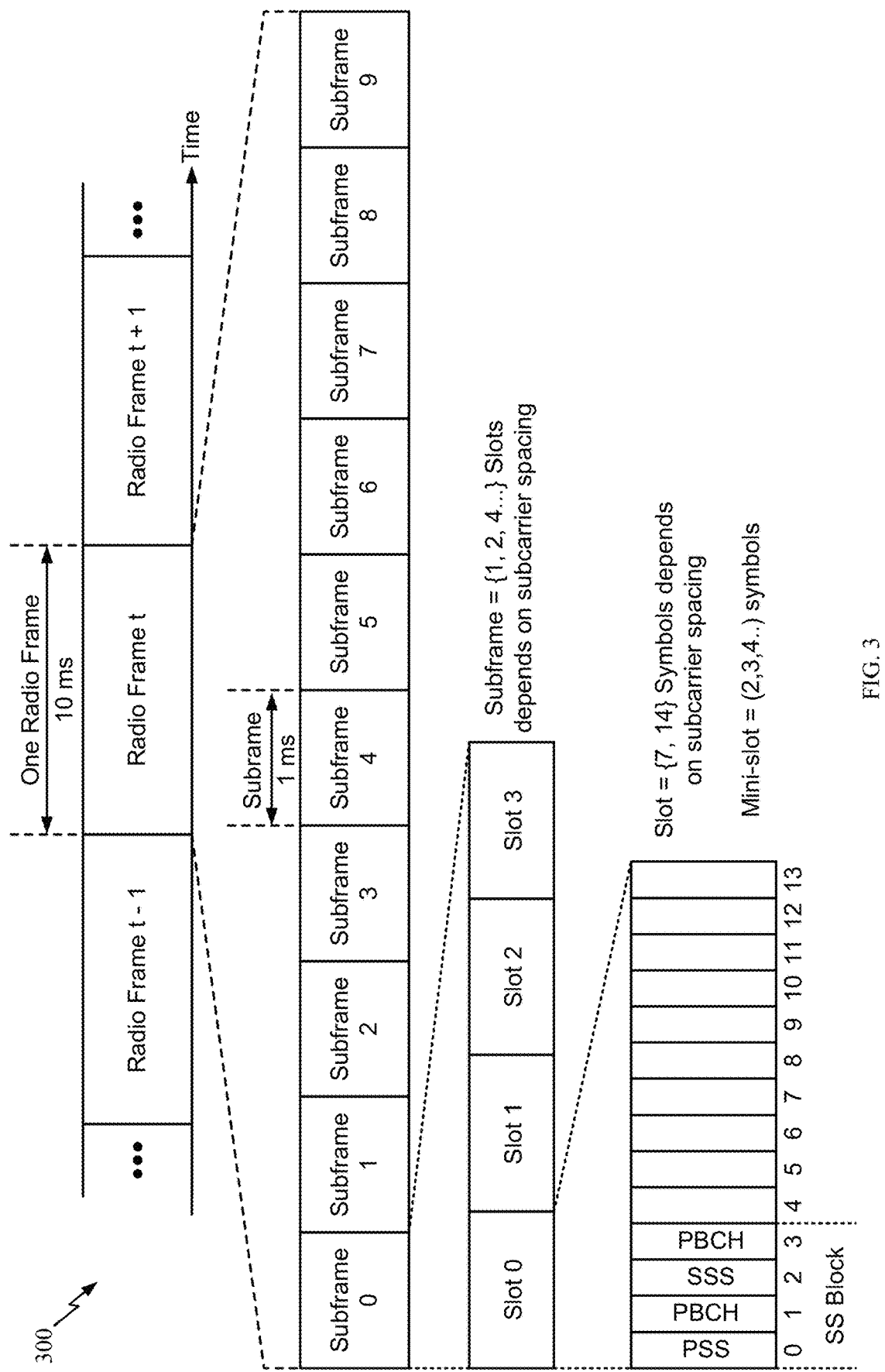
FIG. 3 shows an example frame format for communication in a wireless communication network, in accordance with some aspects of the present disclosure.

FIG. 3 is a diagram showing an example of a frame format 300 for NR. The transmission timeline for each of the downlink and uplink may be partitioned into units of radio frames. Each radio frame may have a predetermined duration (for example, 10 ms) and may be partitioned into 10 subframes, each of 1 ms, with indices of 0 through 9. Each subframe may include a variable number of slots (for example, 1, 2, 4, 8, 16, . . . slots) depending on the SCS. Each slot may include a variable number of symbol periods (for example, 7 or 14 symbols) depending on the SCS. The symbol periods in each slot may be assigned indices. A mini-slot, which may be referred to as a sub-slot structure, refers to a transmit time interval having a duration less than a slot (for example, 2, 3, or 4 symbols).

Each symbol in a slot may indicate a link direction (for example, DL, UL, or flexible) for data transmission and the link direction for each subframe may be dynamically switched. The link directions may be based on the slot format. Each slot may include DL/UL data as well as DL/UL control information.

Figure 6:
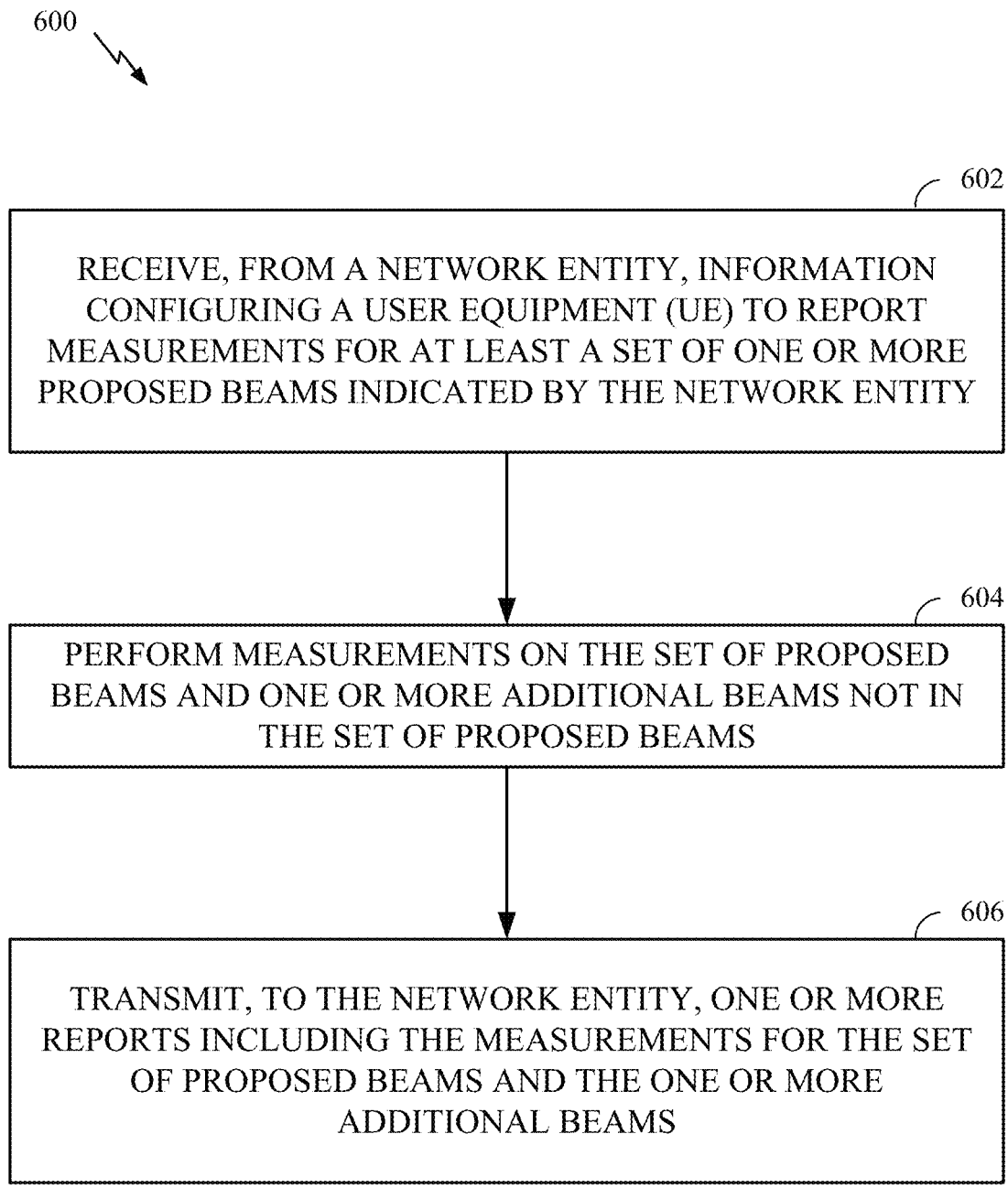
FIG. 6 shows a flowchart illustrating an example process for wireless communication by a user equipment that supports beam selection based on quantized orientation information for a user equipment (UE) in accordance with some aspects of the present disclosure.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within a radio frame, an SS burst set periodicity, and a system frame number, among other examples.

Further system information such as, remaining minimum system information (RMSI), system information blocks (SIBs), other system information (OSI) can be transmitted on a physical downlink shared channel (PDSCH) in certain subframes.

Figure 4:
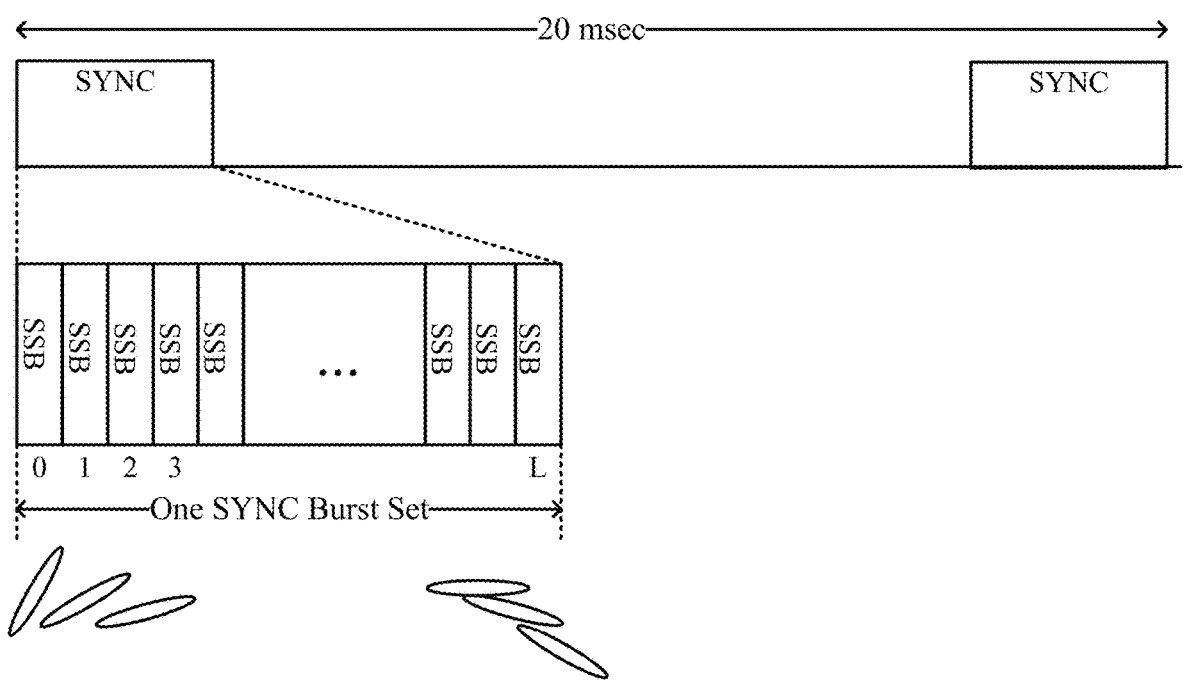
FIG. 4 shows different synchronization signal blocks (SSBs) transmitted using different beams, in accordance with some aspects of the present disclosure

As shown in FIG. 4, the SS blocks may be organized into SS burst sets to support beam sweeping performed as part of a beam management procedure. As shown, each SSB within a burst set may be transmitted using a different beam, which may help a UE quickly acquire both transmit (Tx) and receive (Rx) beams (particular for mmW applications). A physical cell identity (PCI) may still be decoded from the PSS and SSS of the SSB. As shown in FIG. 4, a synchronization burst set, which may be used in beam management procedures, may include L+1 SSBs. Each of the L+1 SSBs may be transmitted by a network entity using a different beam transmitted in a different beam direction. A UE may receive some of the SSBs transmitted in the synchronization burst set and may not receive other SSBs that the network entity transmitted during the beam management procedure. In response to detecting at least some of the SSBs in the synchronization burst set, the UE may generate and transmit a report to the network entity indicating which of the SSBs, corresponding to particular beams the network entity used to transmit the SSBs, that the UE detected as well as indicating signal strength metrics for each of some or all of the detected beams. The network entity can then select one or more of the beams identified in the report for communications to and from the UE and the network entity. For example, the network entity may select the n beams with the highest signal quality metrics to communicate with the UE. In some other examples, the UE may identify a single beam, such as the beam with the highest signal quality metric, in the report transmitted to the network entity, and the network entity can use the identified beam for communications to and from the UE.

NR deployment options may include non-standalone (NSA) or standalone (SA) options. Some deployment scenarios may include one or both NR deployment options. A standalone cell may need to broadcast both SSBs and remaining minimum system information (RMSI), for example, using SIB1 and SIB2. A non-standalone cell may need to broadcast SSBs, but may not need to broadcast RMSI. In a single carrier in NR, multiple SSBs may be sent in different frequencies, and may include various different types of SSBs.

SSB bursts, as shown in FIG. 4, may be used for beam management. Typical beam management procedures may entail a beam sweeping procedure in which a network entity, such as a base station, transmits beams consecutively in each of multiple directions. The beam directions may, for example, collectively cover 360 degrees around the network entity over a plurality of directions (for example, 64 different beam directions). In another example, the beam directions may cover a portion of a total coverage area served by a network entity. For example, in a deployment where a network entity includes three antenna panels, each antenna panel may cover a 120 degree segment of the total coverage area, and the beam directions may collectively cover the 120 degree segment over the plurality of directions. However, for any given UE in either of such deployment scenarios or others, only a subset of the beams may be detected during the beam management procedure. For example, transmissions using a beam direction opposite of a direction from the network entity to the UE may not be detected by the UE. Because only a subset of the beams may be detected, the network entity may waste network resources in performing a beam sweep across each of the plurality of directions, which may reduce the amount of resources available for other transmissions (for example, data transmissions).

According to some aspects of the present disclosure, beam management procedures may be enhanced (for example, in FR2) using side-information and machine learning models. The side information may include, for example, UE position information, which may include latitude and longitude information from a satellite position system, time difference of arrival (TDOA) information determined for signals transmitted between the network entity and the UE, and UE orientation information, among other examples.

Example ML Based Beam Prediction

Figure 5:
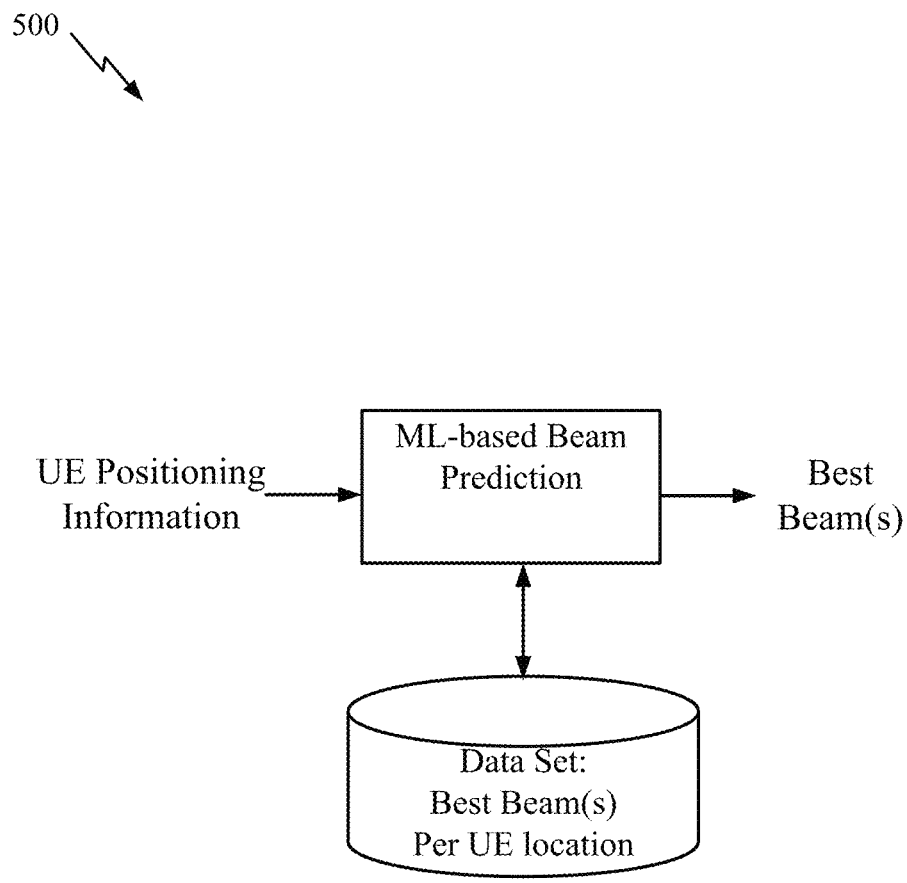
FIG. 5 shows an example machine learning (ML)-based beam prediction module that supports beam selection based on beam measurements reported by a user equipment (UE), in accordance with some aspects of the present disclosure.

As illustrated in FIG. 5, a machine learning (ML)-based (beam prediction) model may be trained to learn relationships between the position of a UE, such as one or more of a location, device orientation, direction, or other information indicative of UE position or change in position, and one or more best (or "optimal") beams or other suitable beams that may be used to communicate with the UE. Position determinations may be performed by the UE, by a network entity such as a gNB, or by a location server referred to as a location management function (LMF). The size of a dataset associating UE position to one or more best beams may be large, because there may be a potentially unlimited number of combinations of UE position information and best beams used for communications between the network entity and the UE. Further, the size of the dataset may increase as additional position information is included in the dataset. For example, for any given location, a potentially unlimited number of different orientations, over six degrees of freedom (vertical, horizontal, and azimuthal axes, yaw, roll, and pitch), may exist and may be associated with a beam or set of beams for use in communications between a network entity and a UE. As the size of the dataset may be very large, and as a UE may not have sufficient processing power to train a machine learning model based on such a large dataset, it is not feasible to share the entire dataset with the UE. In some cases, rather than share the data set, a more practical approach may be to train the model, such as a neural network (NN), using the dataset, and then share parameters (for example, weights and the like) for the trained model with the UE.

Such a machine learning model may be trained using various techniques to learn optimal beam directions for a given reported location. Given an input of a reported UE location, and in some examples also device orientation, a network entity on which the trained machine learning model is deployed can predict a set of beams to use in performing a beam sweep. This set of beams and associated directions may be a subset of the beams and associated directions that are supported by the network entity. The network entity can transmit using the predicted set of beams and need not sweep across each possible beam direction in order to identify the best beams to use in communicating with the UE.

In some implementations, the machine learning model may be trained using supervised learning techniques in which an input data set of a plurality of {location, beam direction(s)} two-tuples is used to train the machine learning model to recognize relationships between different locations and orientations and the optimal beam directions for communicating with a UE at different locations and based on different device orientations. The input data set may include or be derived from information, for example, received in relation to communications using sub-6 GHz bands. The machine learning model may be trained to output information that may be relevant to communications using other bands (for example, mmWave bands), such as information predicting a best beam or set of beams, or information associated with a predicted best beam or set of best beams, that may then be used to select and generate a beam for communication with the UE. In some implementations, the machine learning model may include a softmax layer that generates a probability score for each beam direction. The network entity on which the machine learning model is deployed can use the generated probability scores to identify beams to use in communicating with a UE. The beam(s) that may be predicted to be or identified as the best beams to communicate with the UE may, thus, be the n beams with the highest probability scores generated by the machine learning model based on the current location of the UE.

The machine learning model may be trained offline and deployed to a network entity (for example, a gNodeB) for use in identifying one or more best beams or probable best beams for use in communicating with a UE based on a reported location of the UE. During wireless communications operations, the UE may independently determine its location (and in some examples also orientation), identify a best beam (for example, based on a beam sweep), and report the determined location (or location and orientation) and the identified best beam to the network entity. If the identified best beam matches the best beam predicted by the machine learning model deployed at the network entity, the network entity may determine that the machine learning model is accurate. If, however, the identified best beam is a mismatch with the best beam predicted by the machine learning model, the network entity may determine that one or more errors in the machine learning model or in identifying the best beam exist.

For example, the best or optimal beam directions determined during the deployment phase may be inaccurate, for example, due to poor reference signal received power (RSRP) or signal-to-interference-plus-noise (SINR). Another potential source of mismatch stems from the fact that, even though the location estimates and best beam estimates may be accurate, the actual environmental conditions at the time of beam selection may be quite different than the environmental conditions during the training phase. In other words, there may be some dynamic aspects of the environment surrounding the base station and UEs that were not captured during the offline training phase (for example, such as a car passing by, or the like). It may be difficult to alleviate mismatch caused by such issues due to the different environmental conditions. However, if a network entity consistently observes that for a given UE position, other sets of best beams are reported by a UE (different than the ML-predicted beams) then the network entity may infer that this mismatch is not due to the dynamics of the environment, and that the dataset needs to be updated.

The machine learning described herein may take advantage of any appropriate machine learning algorithm. In some non-limiting examples, the machine learning algorithm is a supervised learning algorithm, unsupervised learning algorithm, reinforcement learning algorithm, a deep learning algorithm or an artificial neural network algorithm.

In some examples, the machine learning is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network may be composed of an interconnected group of artificial neurons (for example, neuron models). These artificial neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (for example, weight values are established during a training phase in which the network learns how to identify particular classes by their typical input data characteristics).

Different types of artificial neural networks can be used to implement machine learning, such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (for example, a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, the machine learning is performed using a deep convolutional network (DCN). DCNs are collections of convolutional networks, configured with additional pooling and normalization layers. DCNs have achieved state-of-the-art performance on many tasks. DCNs can be trained using supervised learning in which both the inputs and outputs are known for many exemplars and are used to modify the weights of the network by use of gradient descent methods. That is, the a training data set may include a plurality of vectors, with each vector having an input data set from which a DCN is trained to generate an inference, and an output corresponding to the inference that the DCN should generate for the input data set. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

Example Reporting Beam Measurements for Proposed Beams and Other Beams for Beam Selection As described above, various aspects of the present disclosure relate to beam management procedures in wireless communications systems. Some implementations of the present disclosure more specifically provide techniques for reporting measurements for proposed beams (such as beams predicted to be the best beams for communications to and from a UE and a network entity) and other beams detected by the UE. The techniques may be used, for example, to identify mismatches between a proposed set of beams and actual best beams for communications to and from a UE and a network entity and allow for the retraining of machine learning models used to identify the proposed set of beams for communications to and from a UE and a network entity. By doing so, the techniques may allow for efficient and accurate selection of beams for use in communications between a network entity and a UE, which may allow for reduced monitoring time by a UE and/or free up resources (that would otherwise be used for SSB transmissions) for data transmissions.

As described above, a machine learning based algorithm may be trained to predict a set of (optimal/best) beams for a UE given the position of the UE at any particular time. The machine learning based algorithm may be trained prior to regular operations at the network entity and deployed to the network entity once trained and verified. Over time, the training data set used to train the machine learning based algorithm may be augmented with updated information correlating UE position information and the set of (optimal/best) beams for the UE. As the training data set is augmented, a system can retrain the machine learning based algorithm and may deploy the retrained machine learning based algorithm to the network entity for use in subsequent predictions of a set of beams for a UE given the position of the UE at any particular time in the future.

According to particular aspects, a UE may receive information identifying one or more proposed beams for communications between the UE and the network entity. The UE may be configured to report measurements for the proposed beams and one or more other beams determined by the UE and transmit reports including these measurements to the network entity.

A network entity, correspondingly, may receive the reports and determine whether a mismatch exists between the proposed beams, representing beams that the network entity predicted to be the best beams for communications between the network entity and the UE, and the other beams reported by the UE. A mismatch may exist, for example, where the beams identified in a measurement report for the one or more other beams are not included in a measurement report for the proposed beams. The network entity may continually monitor the received reports for discrepancies between the measurement report for the one or more other beams and the measurement report for the proposed beams. When the network entity identifies a consistent pattern of discrepancies between the reports, the network entity can determine that the machine learning model is not generating an accurate prediction of best beams for communications with UEs given particular position information and may retrain the machine learning model to accurately predict beams for communicating to and from the UE and the network entity given the particular position information.

FIG. 6 shows a flowchart illustrating an example process 600 for wireless communication by a user equipment that supports reporting beam measurements for proposed beams and other beams, in accordance with some aspects of the present disclosure. The operations of process 600 may be implemented by a wireless communication device or its components as described herein. For example, process 600 may be performed by a UE 120a of FIG. 1 or FIG. 2 to receive configuration information for reporting measurements for at least one or more proposed beams based on the reported orientation and/or location information, in accordance with some aspects of the present disclosure.

In some implementations, process 600 begins in block 602 with the UE receiving, from a network entity, information configuring the UE to report measurements for at least a set of one or more proposed beams indicated by the network entity. The one or more proposed beams determined by the network entity may be beams in a set of beams that the network entity predicts are the best beams for communications to and from the network entity and the UE based on position information associated with the location of a UE. The position information may include, for example, a position of a UE determined based on various signals, such as signals from a satellite positioning system (for example, NAVSTAR GPS, GALILEO, or other satellite position systems, whether global or regional in coverage), signals identifying a room in a building that the UE is located in, time difference of arrival (TDOA) calculations performed based on signals received from multiple network entities, or other signaling that can be used to identify the location of a UE. The UE position may also include, for example, orientation information determined by one or more sensors at a UE. The orientation information may be determined over six degrees of freedom (vertical, horizontal, and azimuthal axes, yaw, roll, and pitch) and may identify a direction that the UE is facing, a direction that the antennas of the UE are facing, and other orientation information for the UE.

At block 604, the UE performs measurements on the set of proposed beams and one or more additional beams not in the set of proposed beams. The measurements for the one or more additional beams may include measurements for the n beams with the highest measured signal quality metrics. To perform these measurements, the UE may receive information identifying a duration of an SSB burst in which SSBs are transmitted by the network entity on different beams. The UE can detect the SSBs included in the SSB burst and measure a signal quality metric for each SSB in the SSB burst, which corresponds to a signal quality metric for a beam used to transmit each SSB. The UE can then identify the n highest measured signal quality metrics and the beams associated with these n highest measured signal quality metrics and report information about the identified beams to a network entity. The signal quality metrics may include, for example, a reference signal received power (RSRP) measurement, a received signal strength indicator (RSSI), or other signal quality measurements for each of the identified beams.

At block 606, the UE transmits, to the network entity, one or more reports including the measurements for the set of proposed beams and the additional beams. These reports may be transmitted to the network entity separately or together. In some implementations, the reports may include a first report including measurements for the set of proposed beams and a second report including measurements for the additional beams (for example, the n best beams measured in an SSB burst). In some implementations, measurements for the additional beams may also or alternatively include measurements for beams that diverge from a predicted measurement by more than a threshold amount. The UE may transmit the first report and the second report periodically using the same or a different periodicity and in the same or different transmissions to the network entity. For example, the first report including measurements for the proposed beams may be transmitted using a first periodicity, and the second report including measurements for the other beams may be transmitted using a second periodicity that results in less frequent reporting than the first periodicity.

Figure 7:
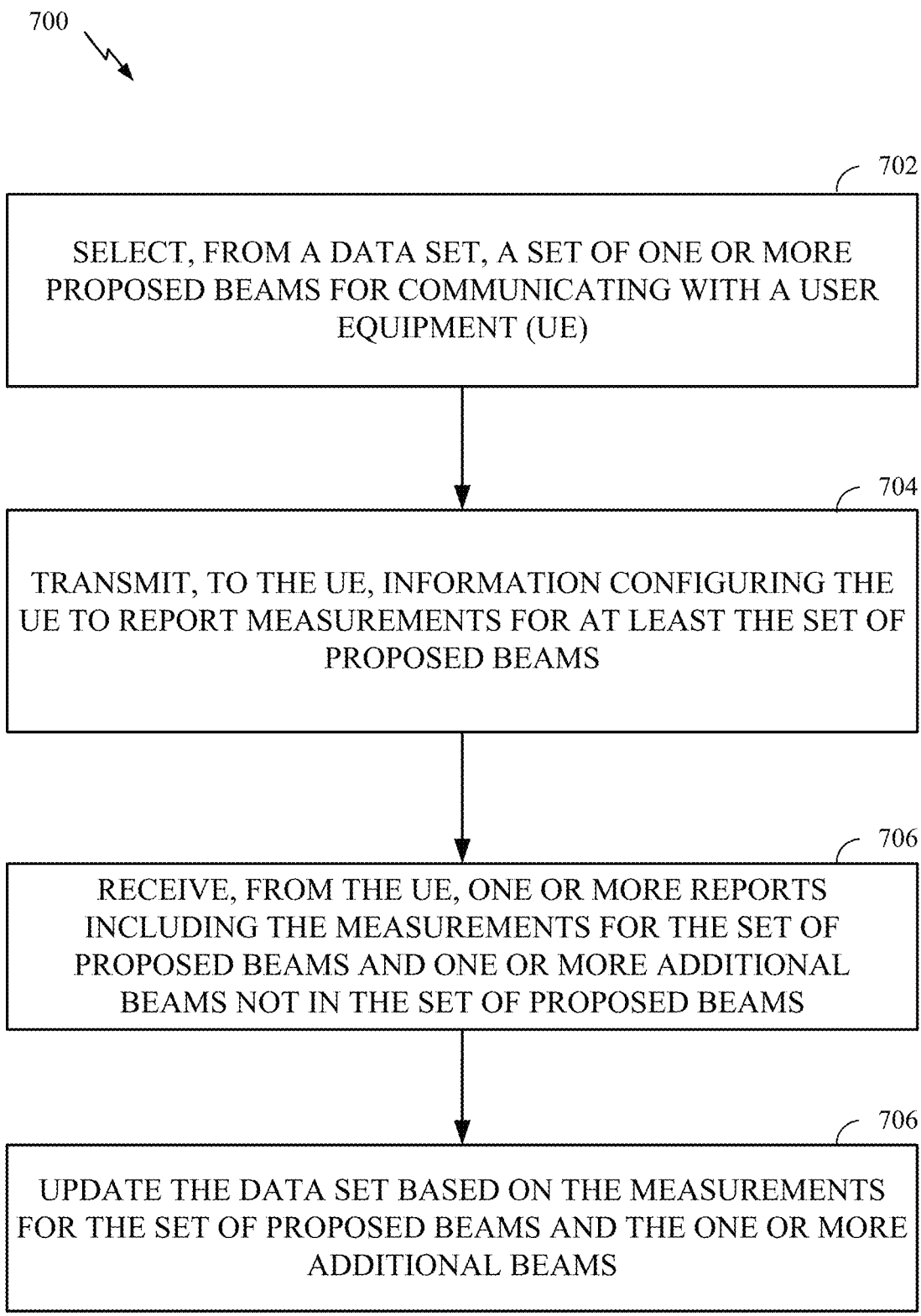
FIG. 7 shows a flowchart illustrating an example process for wireless communication by a user equipment that supports beam selection based on quantized orientation information for a user equipment (UE) in accordance with some aspects of the present disclosure.

FIG. 7 shows a flowchart illustrating an example process 700 for wireless communications by a network entity that supports beam selection based on quantized orientation information for a user equipment (UE). Process 700 may be considered complementary to process 600 of FIG. 6. The operations of process 700 may be implemented by a wireless communication device or its components as described herein. For example, the operations of process 700 may be performed by a base station 120a (for example, a gNB) of FIG. 1 or FIG. 2 to configure a UE to measure at least one or more proposed beams identified by the network entity (e.g., based on quantized orientation information) and receive measurements for at least the one or more proposed beams from a UE performing process 600 of FIG. 6.

In some implementations, process 700 begins, at block 702, with the network entity selecting, from a data set, a set of one or more proposed beams for communicating with a user equipment (UE). In some implementations, the set of proposed beams may be selected based on UE position information previously reported to the network entity and a machine learning model trained to predict beams that are likely to be the best or optimal beams for communications to and from the network entity and the UE.

At block 704, the network entity transmits, to a UE, information configuring the UE to report measurements for at least the set of proposed beams determined by the network entity. The information may include information indicating the proposed beams selected at block 702 above. In some implementations, the information may also identify one or more additional beams to measure or provide information about various beams that can be measured (e.g., during an SSB burst). For example, the information may include information about a time and duration of an SSB burst that the network entity will perform, and the information may be carried in one or more system information blocks (SIBs).

At block 706 the network entity receives one or more reports including the measurements for the set of proposed beams and one or more additional beams not in the set of proposed beams. The reports may be received at the network entity as separate reports or in a joint report. In some implementations, the reports may include a first report including measurements for the proposed beams and a second report including measurements for the additional beams (for example, the n best beams measured in an SSB burst). The network entity may receive the first report and the second report periodically using the same or a different periodicity. For example, the first report including measurements for the proposed beams may be received using a first periodicity, and the second report including measurements for the additional beams may be received using a second periodicity that results in less frequent reporting than the first periodicity.

At block 708, the network entity updates the data set based on the measurements for the set of proposed beams and the one or more additional beams. In some implementations, to update the data set, the network entity can add an entry correlating the best beams identified by the UE to UE position information. The data set may be updated, for example, when the network entity detects a consistent mismatch between the proposed beams and the one or more other beams. For example, suppose that the network entity reports beams $B_1$, $B_2$, and $B_3$ to the UE as the proposed beams based on UE position information and the UE indicates that the best beams, based on measurements at the UE, are beams $B_3$, $B_4$, and $B_5$ for a threshold number of times. Based on the mismatch, the network entity can determine that the current data in the data set correlating the UE position information to beams $B_1$, $B_2$, and $B_3$ and replace the entry in the data set correlating the UE position information to beams $B_1$, $B_2$, and $B_3$ with a new entry correlating the UE position information to beams $B_4$, $B_5$, and $B_6$. In some implementations, the network entity may retrain a machine learning model used to predict best beams to use in communications to and from the UE and the network entity based on the updated data set.

Figure 8:
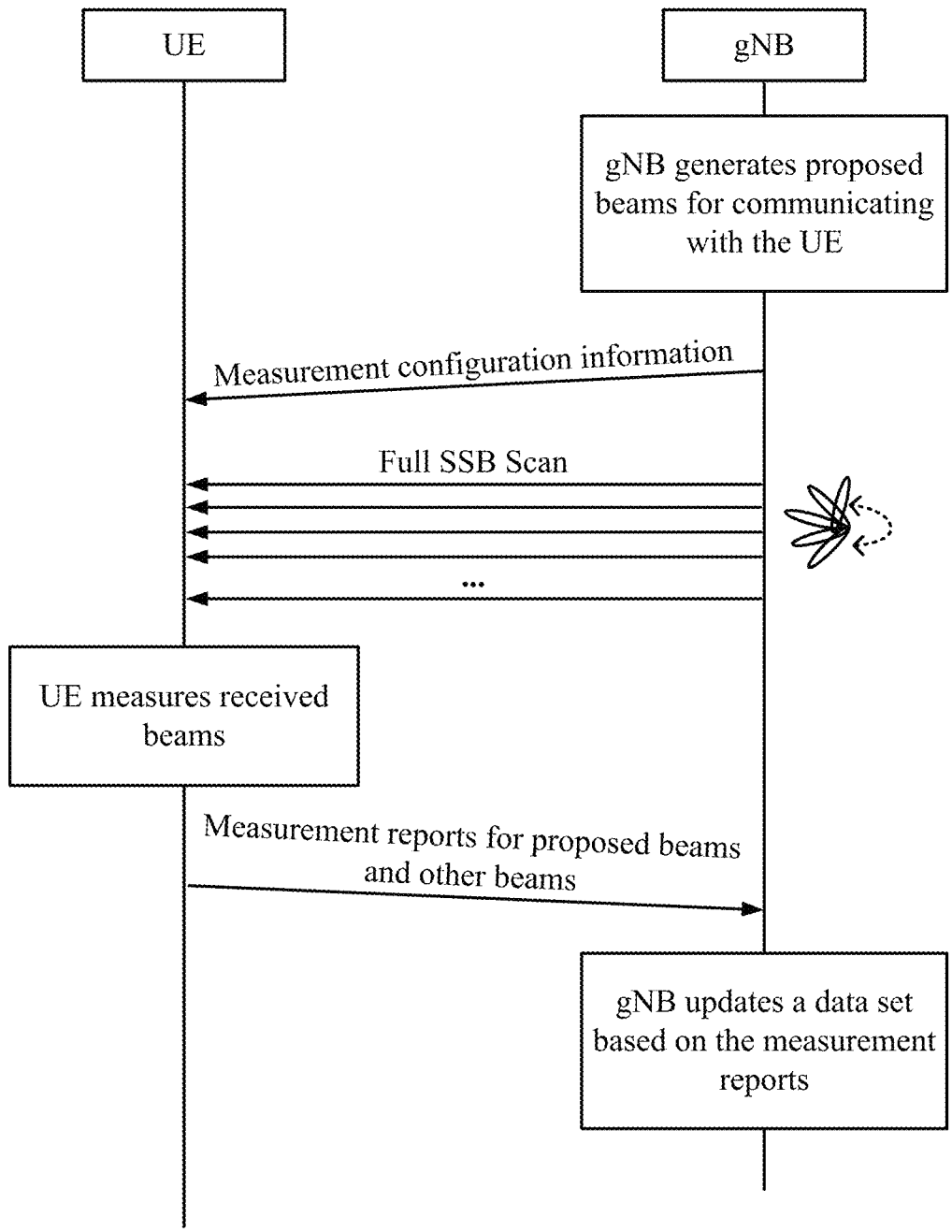
FIG. 8 shows a call flow diagram illustrating an example of UE orientation information reporting and beam prediction that supports beam selection based on quantized orientation information for a user equipment (UE), in accordance with some aspects of the present disclosure.

Operations 600 and 700 of FIGS. 6 and 7 may be understood with reference to the call flow diagram shown in FIG. 8. In other words, the gNB and UEs of FIG. 8 may perform operations 600 and 700 of FIGS. 6 and 7.

FIG. 8 shows a call flow diagram illustrating an example of UE beam measurement reporting by devices in a wireless communications network that supports beam selection based on UE position information, in accordance with some aspects of the present disclosure.

As illustrated in FIG. 8, the gNB may initially generate a proposed set of beams for communicating with the UE. The proposed set of beams may be generated based on position information reported by the UE to the gNB. The position information may include, for example, the geographic location of the UE determined based on a satellite position system, time difference of arrival (TDOA) information derived from signals received from a plurality of network entities, or other techniques for determining the geographic location of the UE. The position information may also include orientation information for the UE determined based on compasses, gyroscopes, accelerometers, barometers, and/or other orientation/position sensors at the UE.

The gNB can input the received UE position information into a machine learning model trained to generate a proposed set of beams to use in communications to and from the UE and the gNB. The proposed set of beams may be, for example, a reduced set of beams (for example, a set of "best" beams) to use in transmitting or receiving communications to or from the network entity. The reduced set of beams may be, for example, a set of beams predicted to result in a highest signal strength (such as RSSI or RSRP, among other examples) at the UE given the position information from the UE.

After generating the proposed set of beams, the gNB can transmit measurement configuration information to the UE. The measurement configuration information, as discussed, may include information configuring the UE to report measurements for one or more proposed beams determined by the network entity in addition to one or more beams determined by the UE. In some implementations, the configuration information may configure the UE to report measurements for the n beams having the highest signal quality metrics (such as RSSI or RSRP). The network entity may transmit the measurement configuration information in one or more system information blocks (SIBs) identifying at least a timing and duration for an SSB burst in which the network entity is to transmit SSBs using the proposed set of beams and the one or more other beams.

The gNB can proceed to transmit an SSB burst to the UE. The UE may receive the SSBs in the SSB burst and may measure a signal quality metric for the proposed beams and one or more other beams used to transmit SSBs in the SSB burst. Based on the measured signal quality metric, the UE can generate and transmit one or more reports including the measurements for the proposed beams and one or more other beams. As discussed, the one or more reports may include a single report including measurements for both the proposed beams and one or more other beams or separate reports for the proposed beams and one or more other beams. In some implementations, the gNB can perform a full beam sweep to transmit SSBs on each of the beams on which the gNB can transmit. The UE may perform measurements for each of the beams and, in some implementations, select the n beams with highest measured signal quality metrics, and report the selected n beams as the one or more other beams and the measurements associated with the selected n beams to the network entity.

In some implementations, the other beams reported to the network entity may include beams for which a condition for reporting measurements has been satisfied. A UE may receive information including conditions for reporting measurements for other beams in the configuration information received from the network entity. For example, a condition may include a change in a received signal strength of a beam from a value greater than a first threshold to a value less than a second threshold, where the second threshold is less than the first threshold. These beams may correspond to beams that the UE previously received with a high signal strength that the UE now receives with a low signal strength. When a UE determines that a condition has been satisfied for a beam, the UE may report an identification of the beam to the network entity and may indicate to the network entity that the report was triggered based on the condition being satisfied for the identified beam.

In response to receiving the measurement reports, the gNB generally updates a data set used to generate the proposed beams. The gNB may update the data set, for example, to include records associating the best beam(s) identified in the measurement reports with previously reported position information associated with the UE. By doing so, the gNB can generate an updated set of proposed beams for communicating with a UE when a UE reports the same position information to the gNB.

In some implementations, the network entity may configure the UE with a plurality of best beam sets. Each beam set in the plurality of best beam sets may include information associated with a cell identifier of a cell from which beams in each beam set are received and a predicted signal quality metric (for example, RSRP or RSSI) for the beams in the beam set. The information associated with each beam set may include an indication of a reliability metric and an indication of a probability metric for each set of proposed beams in the plurality of sets of proposed beams. The reliability metric may correspond to a predicted likelihood that the UE will successfully receive transmissions on the set of proposed beams, and the probability metric may correspond to a predicted probability that the UE will detect the beams in the set of proposed beams. The information may, in some implementations, include combinations of base stations or transmit receive points (TRPs) that the UE may detect. The UE can use the information included for each beam set, for example, to prioritize the measurement of each of the beam sets. For example, the UE can prioritize measuring beam sets with higher reliability, throughput, or probability metrics over measuring beam sets with lower reliability, throughput, or probability metrics. If a UE needs high reliability, the UE may measure the proposed beam set(s) having higher reliability metrics; if a UE needs high throughput, the UE may measure the proposed beam set(s) having higher throughput metrics; and so on.

In general, various decisions related to UE location and/or SSB beam modification may happen at multiple nodes within a wireless network. For example, a beams-per-location database (for example, such as shown in FIG. 5) may be located at a gNB or at a central server (for example, an AI-based server) which does the training. In some cases, a gNB scheduler may perform the beam scheduling/assignment (for example, both for beam training and for data communication).

In some cases, position/location computation may be performed at the UE, the gNB, or a location server (for example, a LMF in 5G). Corresponding position messaging/reporting may need to be sent to the relevant node, depending on where the decisions are being made. Such messages may be routed through other nodes. For example, such message may be sent to a gNB, which then passes such messages on to a server (for example, an AI-based server). In other cases, such messages may be sent to a server, via a gNB, but in a message the gNB is unable to decode (in a message referred to as a 'containerized' message). Such messages may be used to carry position reports in certain protocols, such as LTE position protocol (LPP), which utilizes RRC messages between a UE and LMF. In some cases, an LMF may be located at a gNB. In such cases, the LPP protocol may still be used or faster (lower-layer) reports may be sent to the gNB (for example, via L1 or MAC-CE signaling), instead of containerized RRC messages.

Figure 9:
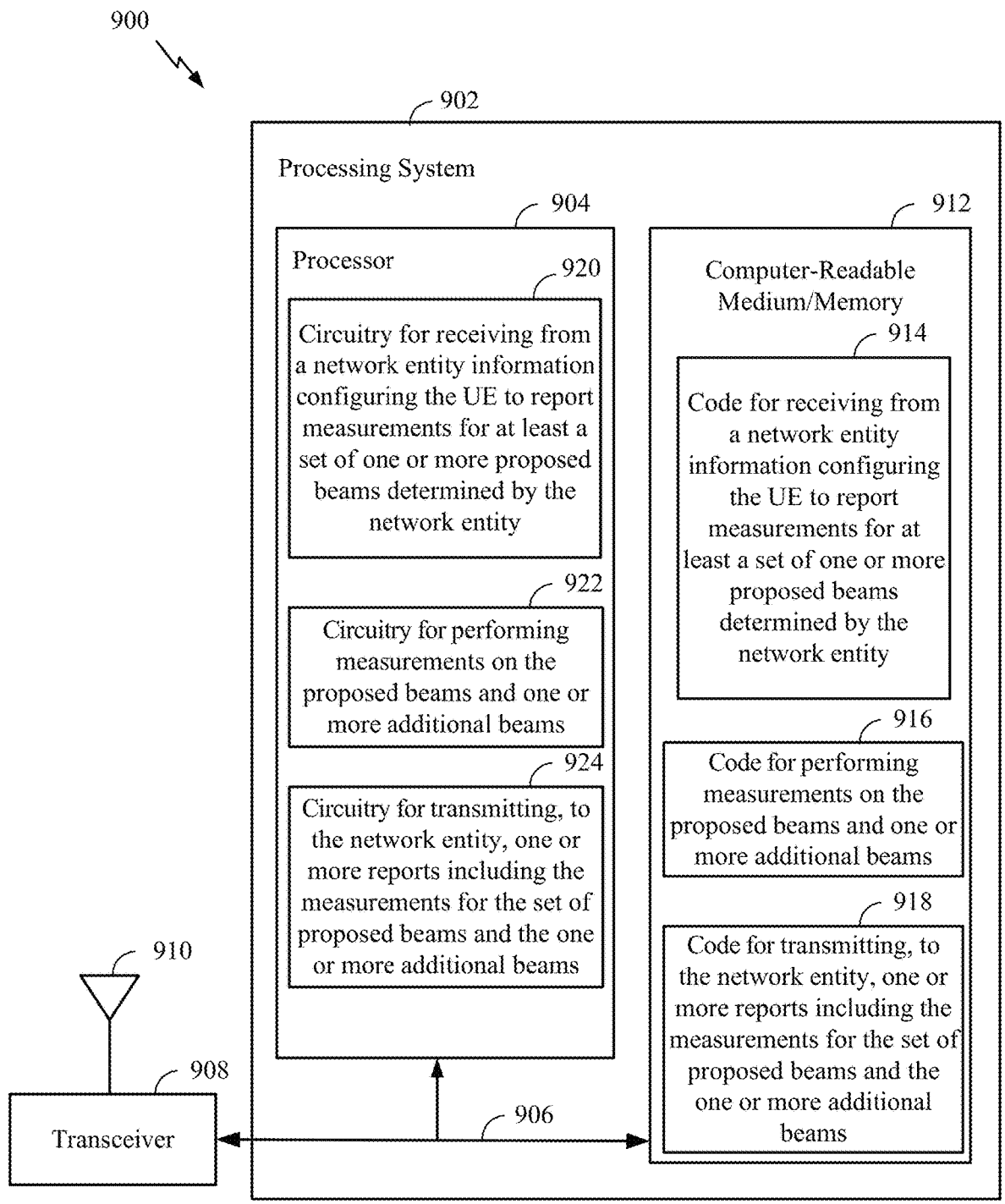
FIG. 9 shows an example communications device that includes components configured to perform operations that support beam selection based on quantized orientation information for a user equipment (UE), in accordance with aspects of the present disclosure.

FIG. 9 illustrates a communications device 900 (for example, a user equipment) that may include various components (for example, corresponding to means-plus-function components) configured to perform operations for the techniques disclosed herein, such as the operations illustrated in FIG. 6. The communications device 900 includes a processing system 902 coupled to a transceiver 908 (for example, a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In some aspects, the computer-readable medium/memory 912 is configured to store instructions (for example, computer-executable code) that when executed by the processor 904, cause the processor 904 to perform the operations illustrated in FIG. 6, or other operations for performing the various techniques discussed herein. In some aspects, computer-readable medium/memory 912 stores code 914 for receiving, from a network entity, information configuring the UE to report measurements for at least a set of one or more proposed beams indicated by the network entity; code 916 for performing measurements on the set of proposed beams and one or more additional beams not in the set of proposed beams; and code 918 for transmitting, to the network entity, one or more reports including the measurements for the set of proposed beams and the one or more additional beams. In some aspects, the processor 904 has circuitry configured to implement the code stored in the computer-readable medium/memory 912. The processor 904 includes circuitry 920 for receiving from a network entity information configuring the UE to report measurements for at least a set of one or more proposed beams indicated by the network entity; circuitry 922 for performing measurements on the set of proposed beams and one or more additional beams not in the set of proposed beams; and circuitry 924 for transmitting, to the network entity, one or more reports including the measurements for the set of proposed beams and the one or more additional beams.

Figure 10:
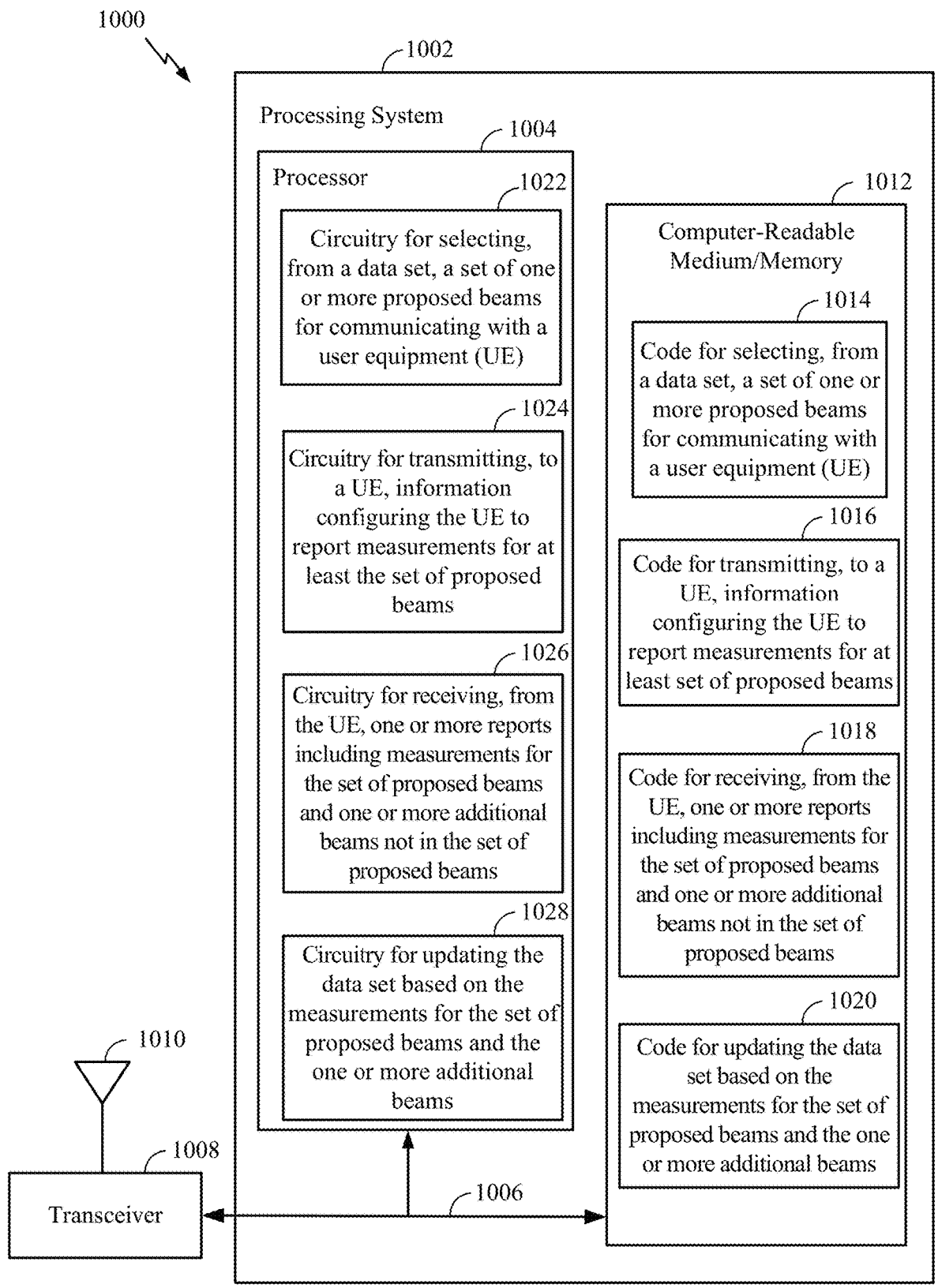
FIG. 10 shows an example communications device that includes components configured to perform operations that support beam selection based on quantized orientation information for a user equipment (UE), in accordance with aspects of the present disclosure.

FIG. 10 illustrates a communications device 1000 (for example, a network entity such as a gNB) that may include various components (for example, corresponding to means-plus-function components) configured to perform operations for the techniques disclosed herein, such as the operations illustrated in FIG. 7. The communications device 1000 includes a processing system 1002 coupled to a transceiver 1008 (for example, a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In some aspects, the computer-readable medium/memory 1012 is configured to store instructions (for example, computer-executable code) that when executed by the processor 1004, cause the processor 1004 to perform the operations illustrated in FIG. 7, or other operations for performing the various techniques discussed herein. In some aspects, computer-readable medium/memory 1012 stores code 1014 for selecting, from a data set, a set of one or more proposed beams for communicating with a user equipment (UE); code 1016 for transmitting, to a UE, information configuring the UE to report measurements for at least the set of proposed beams; code 1018 for receiving, from the UE, one or more reports including measurements for the set of proposed beams and one or more additional beams not in the set of proposed beams; and code 1020 for updating the data set based on the measurements for the set of proposed beams and the one or more additional beams. In some aspects, the processor 1004 has circuitry configured to implement the code stored in the computer-readable medium/memory 1012. The processor 1004 includes circuitry 1022 for selecting, from a data set, a set of one or more proposed beams for communicating with a user equipment (UE); circuitry 1024 for transmitting, to a UE, information configuring the UE to report measurements for at least the set of proposed beams; circuitry 1026 for receiving, from the UE, one or more reports including measurements for the set of proposed beams and one or more additional beams identified by the UE; and circuitry 1028 for updating the data set based on the measurements for the set of proposed beams and the one or more additional beams.

Example Aspects

Clause 1: A method for wireless communication by a user equipment (UE), comprising: receiving, from a network entity, information configuring the UE to report measurements for at least a set of one or more proposed beams indicated by the network entity; performing measurements on the set of proposed beams and one or more additional beams not in the set of proposed beams; and transmitting, to the network entity, one or more reports including the measurements for the set of proposed beams and the one or more additional beams.

Clause 2: The method of Clause 1, further comprising: transmitting, to the network entity, position information associated with a location of the UE, wherein the information configuring the UE to report measurements for at least the set of proposed beams is received based on transmitting the position information.

Clause 3: The method of Clause 2, wherein the one or more proposed beams comprise one or more beams predicted by the network entity to have a highest received signal quality based on the position information associated with the location of the UE.

Clause 4: The method of any one of Clauses 1 through 3, wherein the transmitting comprises: transmitting a first report including the measurements for the set of proposed beams; and transmitting a second report including the measurements for the additional beams not in the set of proposed beams, wherein the first report and the second report are transmitted in separate transmissions.

Clause 5: The method of Clause 4, wherein the transmitting comprises: periodically transmitting first reports including the measurements for the set of proposed beams; and periodically transmitting second reports including the measurements for the additional beams not in the set of proposed beams, wherein the first reports are transmitted less frequently than the second reports.

Clause 6: The method of any one of Clauses 1 through 5, wherein the transmitting comprises: transmitting a single report including the measurements for the set of proposed beams and the measurements for the additional beams not in the set of proposed beams.

Clause 7: The method of any one of Clauses 1 through 6, wherein: the information indicates one or more sets of proposed beams and additional information for each set of proposed beams; and the method further comprises determining which set of proposed beams to perform measurements and transmit reports for based on the additional information.

Clause 8: The method of Clause 7, wherein: the additional information comprises a cell identifier (cell ID); and performing the measurements comprises: performing measurements for a set of proposed beams associated with the cell ID.

Clause 9: The method of any one of Clauses 7 or 8, wherein: the additional information comprises one or more predicted reference signal receive power (RSRP) values; and transmitting the one or more reports comprises reporting measurements for a set of proposed beams responsive to determining that an RSRP measurement for one or more proposed beams in the set is below a predicted RSRP value for the one or more proposed beams.

Clause 10: The method of any one of Clauses 7 through 9, wherein: the additional information comprises at least one of reliability or probability information for each set; the reliability information corresponds to a predicted likelihood that the UE will successfully receive transmissions on the set of proposed beams; the probability metric may correspond to a predicted probability that the UE will detect the set of proposed beams; and the method further comprises prioritizing measuring the sets of proposed beams, wherein the UE prioritizes measuring the sets of proposed beams based on the reliability or probability of each set.

Clause 11: A method for wireless communication by a network entity, comprising: selecting, from a data set, a set of one or more proposed beams for communicating with a user equipment (UE); transmitting, to the UE, information configuring the UE to report measurements for at least the set of proposed beams; receiving, from the UE, one or more reports including measurements for the set of proposed beams and one or more additional beams not in the set of proposed beams; and updating the data set based on the measurements for the set of proposed beams and the one or more additional beams.

Clause 12: The method of Clause 11, further comprising: receiving, from the UE, position information associated with a location of the UE, wherein the information configuring the UE to report measurements for at least the one or more proposed beams is transmitted based on receiving the position information.

Clause 13: The method of Clause 12, wherein the one or more proposed beams comprise one or more beams predicted to have a highest received signal quality based on the position information associated with the location of the UE.

Clause 14: The method of any one of Clauses 11 through 13, wherein the receiving comprises: receiving a first report including the measurements for the set of proposed beams; and receiving a second report including the measurements for the one or more additional beams, wherein the first report and the second report are received in different transmissions from the UE.

Clause 15: The method of Clause 14, wherein the receiving comprises: periodically receiving first reports including the measurements for the set of proposed beams; and periodically receiving second reports including the measurements for the one or more additional beams, wherein the first reports are received less frequently than the second reports.

Clause 16: The method of any one of Clauses 11 through 15, wherein the receiving comprises: receiving a single report including the measurements for the set of proposed beams and the measurements for the one or more additional beams.

Clause 17: The method of any one of Clauses 11 through 16, wherein: the information indicates one or more sets of proposed beams and additional information for each of the sets of proposed beams.

Clause 18: The method of Clause 17, wherein: the additional information comprises a cell identifier (cell ID); and receiving the one or more reports comprises receiving a report including measurements for a set of proposed beams associated with the cell ID, if detected.

Clause 19: The method of any one of Clauses 17 or 18, wherein: the additional information comprises one or more reference signal received power (RSRP) values.

Clause 20: The method of any one of Clauses 17 through 18, wherein: the additional information comprises at least one of a reliability or probability for each of the sets of proposed beams; the reliability information corresponds to a predicted likelihood that the UE will successfully receive transmissions on the set of proposed beams; and the probability metric may correspond to a predicted probability that the UE will detect the set of proposed beams.

Clause 21: An apparatus, comprising: a memory having executable instructions stored thereon; and a processor configured to execute the executable instructions to perform the operations of any of Clauses 1 through 20.

Clause 22: An apparatus, comprising: means for performing the operations of any of Clauses 1 through 20.

Clause 23: A computer-readable medium having instructions stored thereon which, when executed by a processor, performs the operations of any of Clauses 1 through 20.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA) or cdma2000. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (for example 5G RA), Evolved UTRA (E-UTRA), Ultra Mobile Broadband (UMB), IEEE 802.11 (Wi-Fi), IEEE 802.16 (WiMAX), IEEE 802.20 or Flash-OFDMA, among other examples. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG) or UEs for users in the home). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring or a smart bracelet), an entertainment device (for example, a music device, a video device or a satellite radio, among other examples), a vehicular component or sensor, a smart meter/sensor, industrial manufacturing equipment, a global position system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors or location tags, among other examples, that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (for example, looking up in a table, a database or another data structure), ascertaining and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communication by a user equipment (UE), comprising:
   transmitting, to a network entity, associated with a prediction of beam quality by a machine learning model, position information associated with a location of the UE;
   receiving, from the network entity, associated with the position information, configuration information configuring the UE to report measurements for at least a set of one or more proposed beams indicated by the network entity, the set of proposed beams including beams having high predicted received beam qualities at the location of the UE relative to a plurality of possible beams; and
   transmitting, to the network entity, one or more reports including measurements for the set of proposed beams and one or more additional beams not in the set of proposed beams.

2. The method of claim 1, wherein the transmitting comprises:
   transmitting a first report including the measurements for the set of proposed beams; and
   transmitting a second report including the measurements for the additional beams not in the set of proposed beams,
   wherein the first report and the second report are transmitted in separate transmissions.

3. The method of claim 2, wherein the transmitting comprises:
   periodically transmitting first reports including the measurements for the set of proposed beams; and
   periodically transmitting second reports including the measurements for the additional beams not in the set of proposed beams, wherein the first reports are transmitted less frequently than the second reports.

4. The method of claim 1, wherein the transmitting comprises:
   transmitting a single report including the measurements for the set of proposed beams and the measurements for the additional beams not in the set of proposed beams.

5. The method of claim 1, wherein:
   the information indicates one or more sets of proposed beams and additional information for each set of proposed beams; and
   the method further comprises determining which set of proposed beams to perform measurements and transmit reports for based on the additional information.

6. The method of claim 5, wherein:
   the additional information comprises a cell identifier (cell ID); and
   performing the measurements comprises: performing measurements for a set of proposed beams associated with the cell ID.

7. The method of claim 5, wherein:
   the additional information comprises one or more predicted reference signal receive power (RSRP) values; and transmitting the one or more reports comprises reporting measurements for a set of proposed beams responsive to determining that an RSRP measurement for one or more proposed beams in the set is below a predicted RSRP value for the one or more proposed beams.

8. The method of claim 5, wherein:
the additional information comprises at least one of reliability information or a probability metric for each set;
the reliability information corresponds to a predicted likelihood that the UE will successfully receive transmissions on the set of proposed beams;
the probability metric corresponds to a predicted probability that the UE will detect the set of proposed beams; and
the method further comprises prioritizing measuring the sets of proposed beams, wherein the UE prioritizes measuring the sets of proposed beams based on the reliability or probability of each set.

9. A method for wireless communication by a network entity, comprising:
receiving, from a user equipment (UE), position information associated with a location of the UE and one or more reports including measurements for a first set of beams;
selecting, using a machine learning model, the position information, and the one or more reports, a second set of beams including beams predicted by the machine learning model to have high received beam qualities at the location of the UE relative to a plurality of possible beams; and
transmitting, to the UE, configuration information configuring the UE to report measurements for at least the second set of beams.

10. The method of claim 9, wherein the receiving comprises:
receiving a first report including the measurements for the set of proposed beams; and
receiving a second report including the measurements for the one or more additional beams,
wherein the first report and the second report are received in different transmissions from the UE.

11. The method of claim 10, wherein the receiving comprises:
periodically receiving first reports including the measurements for the set of proposed beams; and
periodically receiving second reports including the measurements for the one or more additional beams,
wherein the first reports are received less frequently than the second reports.

12. The method of claim 9, wherein the receiving comprises:
receiving a single report including the measurements for the set of proposed beams and the measurements for the one or more additional beams.

13. The method of claim 9, wherein:
the information indicates one or more sets of proposed beams and additional information for each of the sets of proposed beams.

14. The method of claim 13, wherein:
the additional information comprises a cell identifier (cell ID); and
receiving the one or more reports comprises receiving a report including measurements for a set of proposed beams associated with the cell ID, if detected.

15. The method of claim 13, wherein:
the additional information comprises one or more reference signal received power (RSRP) values.

16. The method of claim 13, wherein:
the additional information comprises at least one of a one of reliability information or a probability metric for each of the sets of proposed beams;
the reliability information corresponds to a predicted likelihood that the UE will successfully receive transmissions on the set of proposed beams; and
the probability metric corresponds to a predicted probability that the UE will detect the set of proposed beams.

17. An apparatus for wireless communication by a user equipment (UE), comprising:
a processor configured to:
transmit, to a network entity, position information associated with a location of the UE in order to trigger prediction of beam quality by a machine learning model;
receive, from the network entity, associated with transmitting the position information, configuration information configuring the UE to report measurements for at least a set of one or more proposed beams indicated by the network entity, the set of proposed beams including one or more beams having high predicted received signal qualities at the location of the UE relative to a superset of possible beams; and
transmit, to the network entity, one or more reports including measurements for the set of proposed beams and one or more additional beams not in the set of proposed beams; and
a memory;
transmitting, to a network entity, position information associated with a location of the UE in order to trigger prediction of beam quality by a machine learning model;
receiving, from the network entity, associated with transmitting the position information, configuration information configuring the UE to report measurements for at least a set of one or more proposed beams indicated by the network entity, the set of proposed beams including beams having relatively high predicted received signal qualities at the location of the UE from a plurality of possible beams;
and
transmitting, to the network entity, one or more reports including measurements for the set of proposed beams and one or more additional beams not in the set of proposed beams.

18. The apparatus of claim 17, wherein the processor is configured to transmit the one or more reports by:
transmitting a first report including the measurements for the set of proposed beams; and
transmitting a second report including the measurements for the one or more additional beams,
wherein the first report and the second report are transmitted in separate transmissions.

19. The apparatus of claim 17, wherein the apparatus is configured to transmit the one or more reports by:
transmitting a single report including the measurements for the set of proposed beams and the measurements for the one or more additional beams.

20. The apparatus of claim 17, wherein:
the information indicates one or more sets of proposed beams and additional information for each set of proposed beams; and the processor is further configured to determine which set of proposed beams to perform measurements and transmit reports for based on the additional information.

21. The apparatus of claim 20, wherein:

the additional information comprises a cell identifier (cell ID); and the processor is configured to perform the measurements by performing measurements for a set of proposed beams associated with the cell ID.

22. The apparatus of claim 20, wherein:

the additional information comprises one or more predicted reference signal receive power (RSRP) values; and the processor is configured to transmit the one or more reports by reporting measurements for a set of proposed beams responsive to determining that an RSRP measurement for one or more proposed beams in the set is below a predicted RSRP value for the one or more proposed beams.

23. The apparatus of claim 20, wherein:

the additional information comprises at least one of reliability information or a probability metric for each set;

the reliability information corresponds to a predicted likelihood that the UE will successfully receive transmissions on the set of proposed beams; and the probability metric corresponds to a predicted probability that the UE will detect the set of proposed beams; and the processor is further configured to prioritize measuring the sets of proposed beams, wherein the UE prioritizes measuring the sets of proposed beams based on the reliability or probability of each set.

24. An apparatus for wireless communication by a network entity, comprising:

a processor configured to:

receive, from a user equipment (UE), position information associated with a location of the UE and one or more reports including measurements for a first set of beams, and select, using a machine learning model, the received position information, and the one or more reports, a second set of beams including beams predicted to have high received beam qualities at the location of the UE relative to a plurality of possible beams; and transmit, to the UE, configuration information configuring the UE to report measurements for at least the set of proposed beams;

and a memory.

* * * * *